United States Patent [19]
Ide

[11] Patent Number: 5,342,714
[45] Date of Patent: Aug. 30, 1994

[54] METHOD FOR RECORDING, ERASING AND REPRODUCING DATA ON AN OPTICAL DATA RECORDING MEDIUM

[75] Inventor: Tatsunori Ide, Tokyo, Japan

[73] Assignee: NEC Corporation, Tokyo, Japan

[21] Appl. No.: 993,852

[22] Filed: Dec. 21, 1992

[30] Foreign Application Priority Data

Dec. 20, 1991 [JP] Japan .................. 3-337361

[51] Int. Cl.$^5$ .............................. G11B 7/00
[52] U.S. Cl. ........................... 430/19; 430/21; 430/346; 430/945; 369/275.2
[58] Field of Search .......... 430/19, 945, 21, 346; 369/275.2

[56] References Cited

U.S. PATENT DOCUMENTS

| | | | |
|---|---|---|---|
| 5,025,439 | 6/1991 | Komaki | 369/100 |
| 5,075,147 | 12/1991 | Usami et al. | 428/64 |
| 5,080,946 | 1/1992 | Takagisi et al. | 428/64 |
| 5,171,618 | 12/1992 | Suzuki | 428/64 |
| 5,194,363 | 3/1993 | Yoshioka et al. | 430/271 |
| 5,196,284 | 3/1993 | Pan et al. | 430/19 |

FOREIGN PATENT DOCUMENTS 0014227 8/1980 European Pat. Off. .

OTHER PUBLICATIONS

Nobuhiro Tokushuku et al., "High C/N Recording in Sb$_2$Se$_3$/Bi Write Once Disk", Technical Digest, International Symposium on Optical Memory 1991, Oct. 1991, Sapporo, Japan, pp. 145–146.

Primary Examiner—Charles L. Bowers, Jr.
Assistant Examiner—John A. McPherson
Attorney, Agent, or Firm—Sughrue, Mion, Zinn, Macpeak & Seas

[57] ABSTRACT

The optical data recording media is provided on a substrate with a recording layer changing its optical characteristic dependent upon difference in the heat history, or processes of temperature elevation due to laser beam irradiation and the following cooling. The media is composed of layered structure not only varying its own reflectance or transmittance as an integrated media, but also changing the optical phase of the reflected light or transmitted light, when the optical characteristic of the recording layer is changed. In the method of recording, erasing and reproducing data using this optical data recording media, when the variations of the reflectance is to be detected, recording and erasing are effected after temporarily setting the recording layer in a state having a higher reflectance. On the other hand, when the variations of the transmittance is to be detected, recording and erasing are effected after temporarily setting the recording layer in a state having a higher transmittance. The substrate has such guide grooves that the width of either the convex portion between the guide grooves or the concave portion of the guide grooves is smaller than the diameter of the laser beam spot for reproduction.

1 Claim, 8 Drawing Sheets

METHOD FOR RECORDING, ERASING AND REPRODUCING DATA ON AN OPTICAL DATA RECORDING MEDIUM

BACKGROUND OF THE INVENTION

The present invention relates to an optical data recording media in which optical characteristics of a material vary dependent on differences in the heat history or processes of temperature elevation due to laser beam irradiation and subsequent cooling. In addition, the present invention relates to a method for recording, erasing and reproducing an optical data on the recording media.

Optical disks for recording and reproducing data using laser beams have drawn great attention as portable file memory means having a large storage capacity, and various kinds of optical disks such as of read-only optical disks, write-once optical disks and overwritable optical disks are known. As overwritable types of the disks, phase-change optical disks, exchange-coupled magneto-optical disks and magnetic field modulation magneto-optical disks are known. In these overwritable optical disks, the phase-change optical disk is adapted to record or erase data by changing the optical characteristics caused by the difference of the heat history or process of temperature elevation due to laser beam irradiation and subsequent cooling. In such a phase-change optical disk, data is recorded, or the latest data is written over the previously recorded data, by modulating the energy of the irradiating light beam between two intensity levels respectively corresponding to optically discriminating two states. Here, there are two energy levels of the irradiating light, that is, the higher level and the lower level, and the former corresponds to "recording power" and the latter corresponds to "erasing power". The reading of data is usually effected by detecting variations in transmittance or reflectance between the aforementioned two states.

Figure 1:
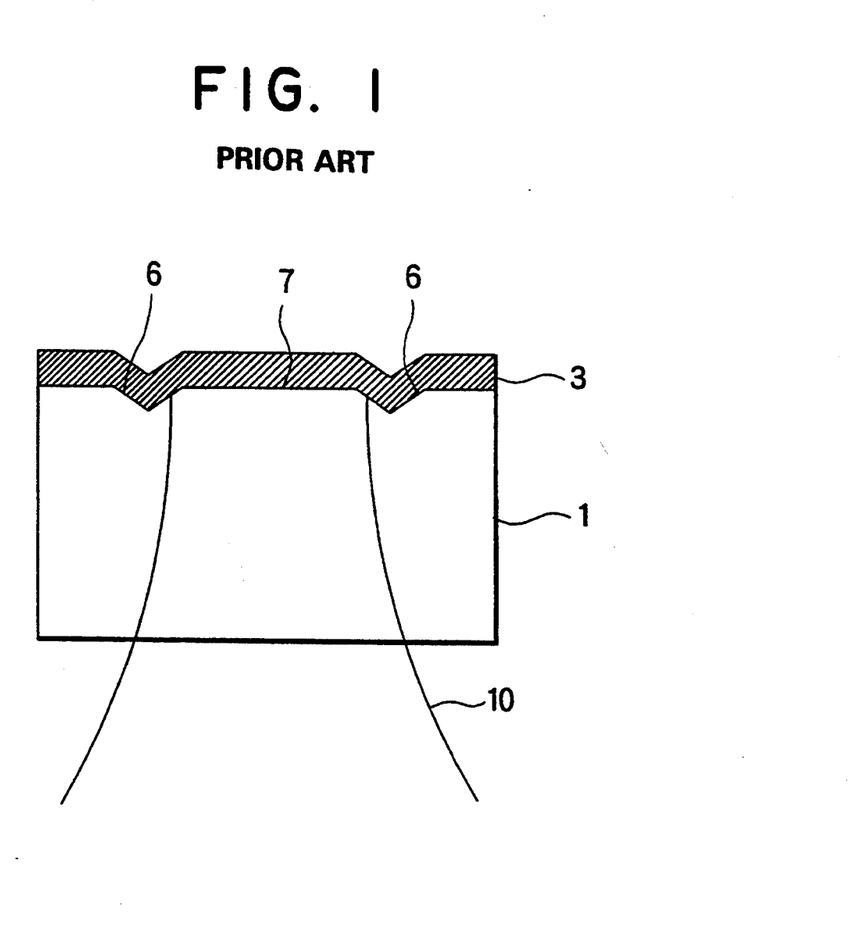
FIG. 1 is a sectional view showing a basic structure of a prior art optical data recording media.

Meanwhile, most of these optical data recording media tend to be formed on a transparent substrate provided with guide grooves. As shown in FIG. 1, V-shaped guide grooves 6 are formed on a surface of a substrate 1, and wide convex portions 7 are disposed between guide grooves 6. Accordingly, grooves and convex portions are also formed on a recording layer 3 formed on substrate 1. Hereinafter, for convenience, a substrate having V-shaped guide grooves 6 as shown in FIG. 1 will be referred to as "V-groove substrate."

In a phase-change type optical disk, reproduction signals are regenerated by detecting variations in the reflectance or transmittance consequent upon the physical phase changes. In such a case, the amplitude of reproduction signals becomes larger as the size of recorded marks becomes greater. And the amplitude of the reproduction signals saturates when the size of the recorded marks is equivalent to, or larger than, the beam size of a laser beam spot 10 used for reproduction. For this reason, sufficient amplitude of reproduction signals cannot be obtained unless a recording mark is large as compared to the beam size of the reproduction laser. Nevertheless, since recording marks in practice are small compared to the beam size of the reproduction laser, signals obtained cannot always exhibit sufficient amplitude. Such deterioration of the amplitude of reproduction signals is more notable as the size of the recording mark becomes smaller because of the recording frequency becomes higher. This also makes it difficult to improve the recording density of phase-change type optical disks.

In order to obtain reproduction signals having a large amplitude, it is possible to optimally design the media structure such that the change in reflectance due to the phase transition may be enhanced. But this also increases the change of the absorptance and causes another problem. That is, upon overwriting operation, signals to be overwritten are apt to be modulated under affection of the prior signals or data, so that the performance of the overwriting operation is degraded.

On the other hand, in order to improve the recording density, Japanese Patent Laid-Open Application (KOKAI) Nos. 2-73537 and 2-113451 disclose methods of providing reproduction signals having sufficient amplitude even for small recording marks. That is, in these methods, the layers structure of the recording media is determined so that the change in reflectance may be small and an optical phase change or difference of the reflected light may be nearly equal to $(1 \pm 2n)\pi$. Such a material having small change in reflectance but causing a large phase difference, however, has a strong dependence of its optical characteristics upon the thickness of each layer of the media, and this requires that the thickness of the layers be within very tight tolerances.

SUMMARY OF THE INVENTION

It is an object of the present invention to provide an optical data recording media which is provided with a recording layer which changes optical characteristics dependent on a difference of the heat history or processes of temperature elevation due to laser beam irradiation and subsequent cooling, and which is capable of reproducing signals with sufficient amplitude even when small recording marks are formed, and therefore can improve the recording density.

Another object of the present invention is to provide a method for recording, erasing and reproducing optical data on an optical data recording media which is provided with a recording layer which changes optical characteristics dependent on difference of the heat history or processes of temperature elevation due to laser beam irradiation and subsequent cooling, which is capable of reproducing signals with sufficient amplitude even when small recording marks are formed, and therefore can improve the recording density.

The present invention relates to an optical data recording media provided on a substrate with a recording layer changing which changes optical characteristics dependent on difference of the heat history or processes of temperature elevation due to laser beam irradiation and subsequent cooling. This optical data recording media has optical phase-changing layers which changes not only the reflectance or transmittance as a whole media, but also changes the optical phase of the reflected light or transmitted light upon the change in optical characteristics of the recording layer.

The method of the invention relates to recording, erasing and reproducing data on the optical data recording media. In this method, recording and erasing are effected after temporarily setting the recording layer in a state having a higher reflectance, if the variations of the reflectance is to be detected. When the variations of the transmittance is to be detected, recording and erasing operations are carried out after temporarily setting the recording layer in a state having a higher transmittance.

The substrate preferably has guide grooves arranged thereon such that the width of either the concave portion of guide grooves or the convex portion formed between the grooves is smaller than the diameter of the laser beam spot for reproduction. A substrate equipped with such guide grooves will be hereinafter called a "U-groove substrate". When the optical data recording media formed on the U-groove substrate is subjected to a recording, erasing or reproducing operation by the irradiation of the laser beam from the substrate side, a recording or erasing operation is executed preferably using the concave portion of the guide grooves if the optical phase change is positive upon the physical phase change which causes the reflectance or transmittance to change from the higher state to the lower state. On the other hand, if the optical phase change is negative upon the physical phase change which causes the reflectance or transmittance to change from the higher state to the lower state, the convex portions formed between the guide grooves are preferably used for recording and erasing.

In a case where data is recorded, erased or reproduced on the optical data recording media according to the present invention, recording is effected after temporarily setting the state of the recording layer to have the higher reflectance (or transmittance). In this state, it is possible to obtain enhanced signals having sufficient amplitude by taking advantage of both the drop of the reproduction signals due to the decrease of the reflectance (or transmittance) caused by recording and the drop of the reproduction signals due to the interference effect caused by the optical phase difference upon recording and erasing. Moreover, the present invention, in contrast to the case in which only the interference effect caused by the optical phase difference is utilized, makes use of the variation of the reflectance (or transmittance), so that it is possible to lessen the dependence of the optical characteristics of each layer upon the thickness thereof, and thus the margin of the thickness in the step of forming layers can be widened.

Meanwhile, the variations of optical characteristics of a recording layer, namely the variations of the optical constants (index of refraction and extinction coefficient) are substantially unique for individual materials. On the other hand, the reflectance, transmittance and absorptance can be varied arbitrarily by changing the layered structure and the thickness of each layer. The reflectance, transmittance and absorptance can be calculated by the matrix method, only if the optical constants for each layer are known. Also in the prior art optical designing, when a layered structure of an optical disk is to be determined, various thicknesses are allotted for each layer to calculate the total reflectance, etc. of the media, so that the thickness of each layer is determined so as to satisfy the desired conditions. In the prior art, it has been assumed and counted as the desired conditions that the change of the reflectance of the whole media upon the change of the optical constants of the recording layer is to be appropriately large and the absorption rate in the recording layer is to be great.

In contrast with this, the present invention is characterized in that not only the change of reflectance or transmittance, but also the optical phase change of the reflected light or transmitted light is taken into consideration in performing an optical design. Accordingly, it is possible to obtain enhanced signals having large amplitude by taking advantage of the interference effect due to the aforesaid optical phase change.

The present invention can also be applied to detect a state change of the recording layer as a change of the reflected light intensity in a case where the substrate has guide grooves and the width of either the concave portion of the guide grooves or the convex portion formed between the grooves is smaller than the size of the laser beam spot for reproduction.

When recording and erasing are executed using the convex portions between the guide grooves, if the state having a higher reflectance is assumed as a reference for the optical phase, the optical phase of the reflected light on the concave portion of the groove is advanced. Therefore, if the optical phase of the reflected light from the portion having a lower reflectance in the convex portion delays, the optical phase difference between the reflected light from the concave portion of the guide groove and the reflected light from the portion having a lower reflectance in the convex portion becomes large. As a result, the interference effect caused by the phase difference becomes large to thereby be able to provide a large amplitude for the reproduction signals.

On the other hand, if the optical phase of the reflected light from the portion having a lower reflectance in the convex portion is advanced, the optical phase difference between the reflected light from the concave portion of the guide groove and the reflected light from the portion having a lower reflectance in the convex portion becomes small. As a result, the interference effect due to the optical phase difference becomes small, and thereby signals having large amplitudes cannot be obtained.

When recording and erasing are executed using the concave portion of the guide grooves, if the state having a higher reflectance is assumed a reference for the optical phase, the optical phase of the reflected light on the convex portion of the groove delays. Therefore, if the optical phase of the reflected light from the portion having a lower reflectance in the concave portion advances, the optical phase difference between the reflected light from the convex portion of the guide groove and the reflected light from the portion having a lower reflectance in the concave portion becomes large. As a result, the interference effect caused by the optical phase difference becomes large to thereby be able to provide a large amplitude for the reproduction signals.

Further, by reducing the width of the portion to be subjected to recording and erasing, that is, either the concave portion of the guide grooves or the convex portion between the guide grooves, to be smaller than the size of the reproduction laser spot, the width for recording marks is limited and therefore the dependence of the recording mark width upon the recording frequency becomes small. As a result, an excellent erasing characteristic can be obtained even when signals of high frequencies are written over the previously recorded signals of low frequencies. Therefore, it becomes possible to record signals in the pulse width modulation mode which enables the recording capacity of the optical disk to be increased.

DETAILED DESCRIPTION OF THE PREFERRED EMBODIMENTS

Figure 2:
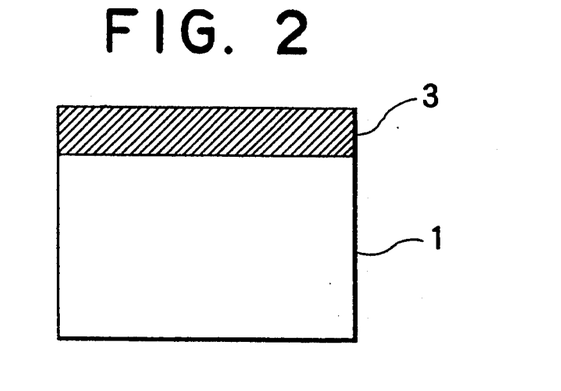
FIG. 2 is a sectional view showing a basic structure of an optical data recording media according to an embodiment of the present invention.
Figure 3:
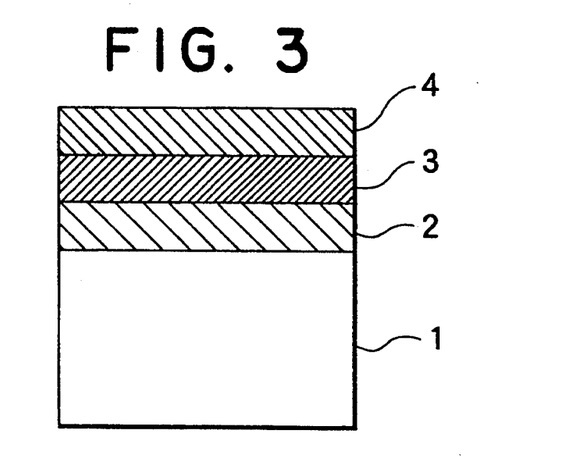
FIG. 3 is a sectional view showing another structure of an optical data recording media according to an embodiment of the invention.

In an optical data recording media of an embodiment according to the invention, there is provided, as shown in FIG. 2, a transparent substrate 1 with a recording layer 3 formed thereon. As recording layer 3, use is made of a material which changes its optical characteristics dependent upon the heat history of temperature elevation due to the laser beam irradiation and the subsequent cooling process. Examples of the material include compounds containing chalcogen-group elements such as Se, Te and the like.

In practice, the optical media is preferably constructed such that recording layer 3 is sandwiched between a base layer (glue layer) 2 and a protection layer 4. More specifically, substrate 1 is covered with base layer 2 on which recording layer 3 is formed, and recording layer 3 is in turn covered with protection layer 4 thereon. Since these layers also work as optical interference layers, the thickness of each layer may and ought to be selected such that the optical phase of the reflected or transmitted light changes as well as the reflectance or transmittance of the media changes in accordance with the transition of recording layer 3 in its optical characteristics. As base layer 2 and protection layer 4, it is possible to use a transparent simple substance or mixture of nitrides such as $Si_3N_4$, AlN, etc., oxides such as SiO, $SiO_2$, $Ta_2O_5$, etc., and/or chalcogenides such as ZnS, ZnSe, MnS etc.

Figure 4:
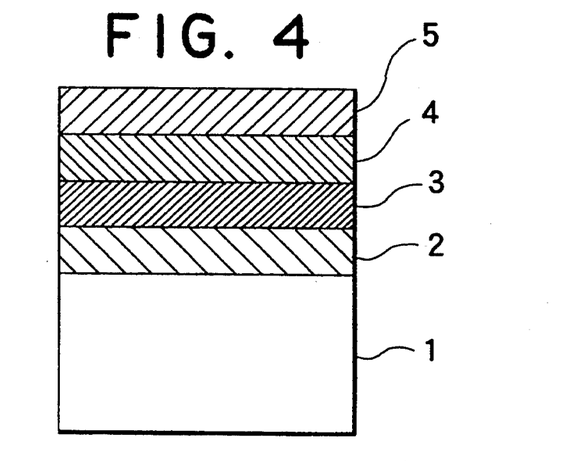
FIG. 4 is a sectional view showing still another structure of an optical data recording media according to an embodiment of the invention.

In order to enhance the optical interference performance as well as to accelerate the cooling rate of the media, it is preferable to provide a reflective layer 5 on protection layer 4 as is shown in FIG. 4. The reflective layer 5 may employ a simple metal such as Al, Au, Ti, Cr, Mo, W, Ta, etc. The reflective layer 5 may be mixed with additives or can be alloyed for adjusting reflectance and/or thermal diffusing efficiency and improving the adhesion to the neighboring layers. It is also possible to use for reflective layer 5 semiconductors having a high index of refraction such as Ge and Si.

The substrate 1 is preferably formed with guide grooves, in advance to forming each layer. For one possible example of the guide groove, there may be provided V-shaped grooves 6 with a wide convex portion 7 therebetween, as shown in FIG. 1.

Figure 5:
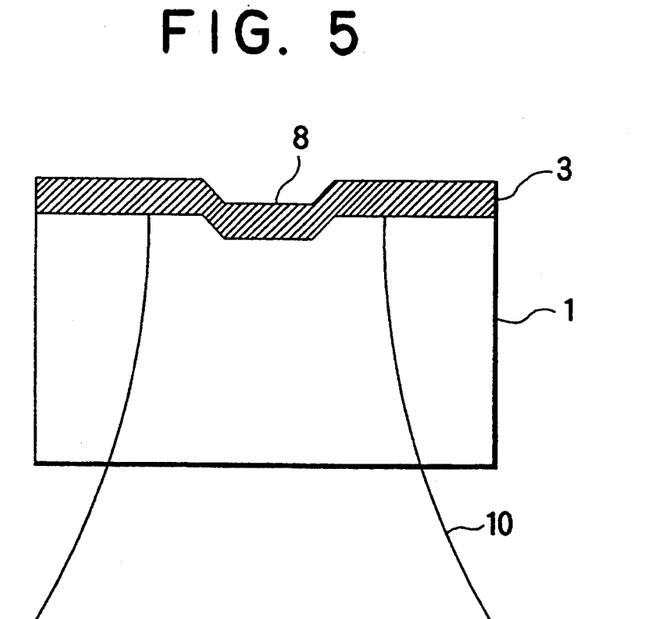
FIG. 5 is a sectional view showing a shape of a guide groove.
Figure 6:
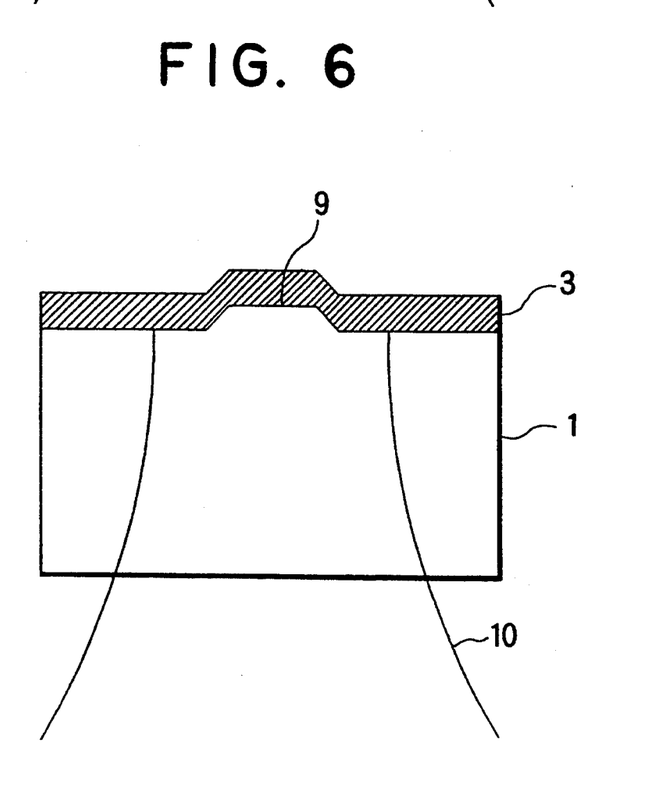
FIG. 6 is a sectional view showing another shape of a guide groove.

The groove can also be constructed such that the width of either the concave portion or the convex portion is smaller than the diameter of the spot of the laser beam for recording, erasing and reproducing. FIG. 5 shows a case in which the concave portion 8 of the guide groove is narrower than the diameter of the spot of a laser beam 10, while FIG. 6 shows a case in which the convex portion 9 between the guide grooves is narrower than the diameter of the spot of the laser beam 10.

The present invention will be described hereinafter with reference to examples.

Figure 7:
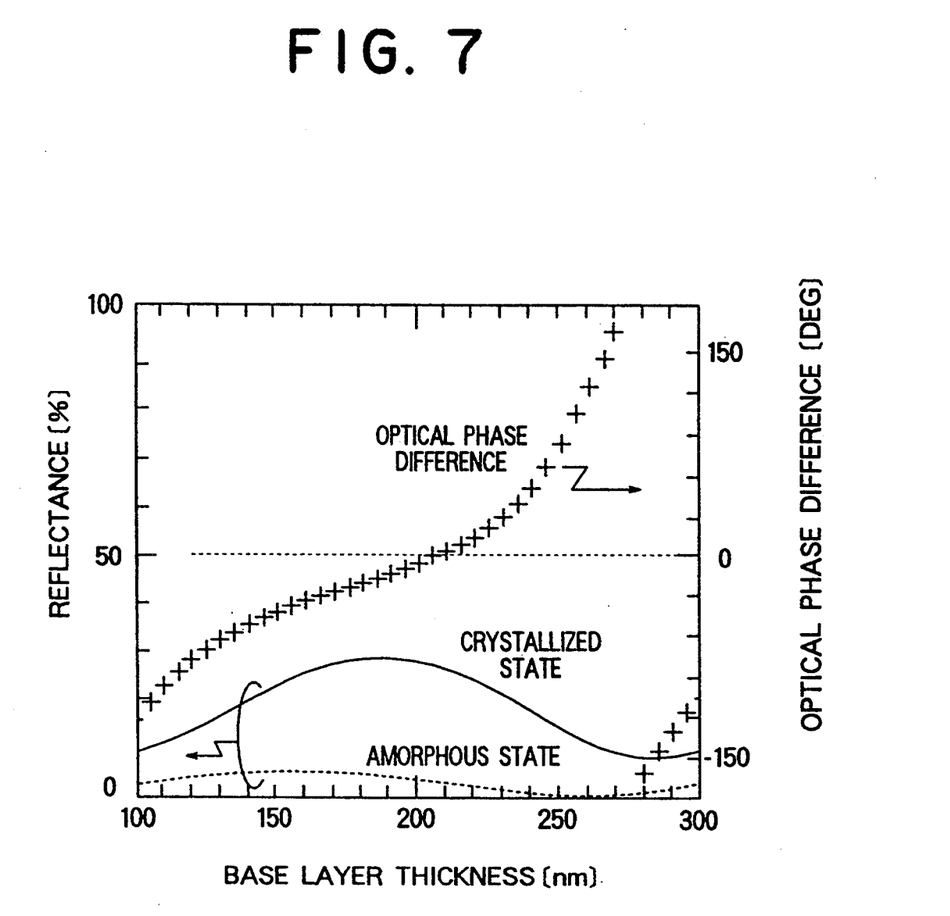
FIG. 7 is a chart illustrating variations of reflectance and optical phase difference consequent upon the physical phase change of an optical data recording media of the invention.

FIG. 4 shows a layered structure of an optical data recording media of a first example. Formed on a polycarbonate substrate 1 were a base layer 2 of ZnS containing 20 atomic % of $SiO_2$ having a thickness of 150 to 300 nm, a recording layer 3 of $Ge_1Sb_4Te_7$ with 20 nm thick, a protection layer 4 of ZnS-20 atomic % of $SiO_2$ with 20 nm thick and a reflective layer 5 consisting of Al layer with 60 nm thick in this order. Reflectance for rays incident on the substrate of the above data recording media can be calculated for each of the crystalline state and the amorphous state. Calculation of the optical phase change of reflected light from the crystalline state to the amorphous state can also be made. The result is shown in FIG. 7. The calculation of the reflectance and the optical phase of reflected light can be carried out using the respective optical constants for recording layer 3, protection layer 4 and reflective layer 5 and the thickness of these layers, by applying the matrix method (refer to for example, "Oyokogaku II (Applied Optics II)", chapter four, Tadao Tsuruta, 1990, Oyobutsuri-Kogaku- Sensho 2 (Applied physical Engineering Series 2) published by BAIFUKAN). Upon the practical calculations of the data shown in FIG. 7, the optical constant of base layer 2 and protection layer 4 was assumed to be 2.2-i0.0, the optical constant of recording layer 3 was assumed to be 5.7-i3.25 in the crystalline state and to be 4.6-i1.6 in the amorphous state, while the optical constant of reflective layer 5 was assumed to be 2.83-i7.75. With the thickness of base layer 2 falling within a range of from about 140 nm to 240 nm, a change of the thickness of base layer 2 can change the optical phase difference sharply from positive to negative without largely affecting the variation of the reflectance due to the physical phase transition. In addition, since the optical phase change occurring with the physical phase transition does not vary sharply dependent upon the thickness of the base layer, the the layer can be formed to relatively large tolerances.

In accordance with a second example, use was made of a polycarbonate substrate 1 of 1.2 mm thick, 130 mm in diameter with guide grooves provided. A base layer 2 consisting of ZnS-20 atomic % of $SiO_2$ layer with 50 nm thick, a recording layer 3 of $Ge_1Sb_4Te_7$ with 20 nm thick, a protection layer 4 of ZnS-20 atomic % of $SiO_2$ layer with 20 nm thick and a reflective layer 5 of Al layer with 60 nm thick were successively formed in this order on the polycarbonate substrate 1 by sputtering for each layer. An ultra-violet curing resin of 9.2 $\mu m$ thick was further coated on the Al layer to complete a specimen. The thus formed disk was subjected to testing. The linear velocity of the rotation of the disk was 11.3 m per second. The specifications of an optical head used for recording, erasing and reproducing was as follows. That is, the wavelength is 820 nm, NA is 0.55, and the diameter of beam spot is 1.5 μm in a direction along the guide groove and is 1.3 μm across the guide groove, and the power for reproduction is constantly 1 mW. Since the recording film immediately after forming was in the amorphous state, the laser beam was irradiated before recording so as to change the amorphous state into the crystallized state. The reflectance for rays incident on the substrate was 9.6% in the amorphous state and 18.0% in the crystalline state. The optical phase change upon the transition from the crystalline state to the amorphous state was calculated 108.5° by the matrix method.

Figure 8:
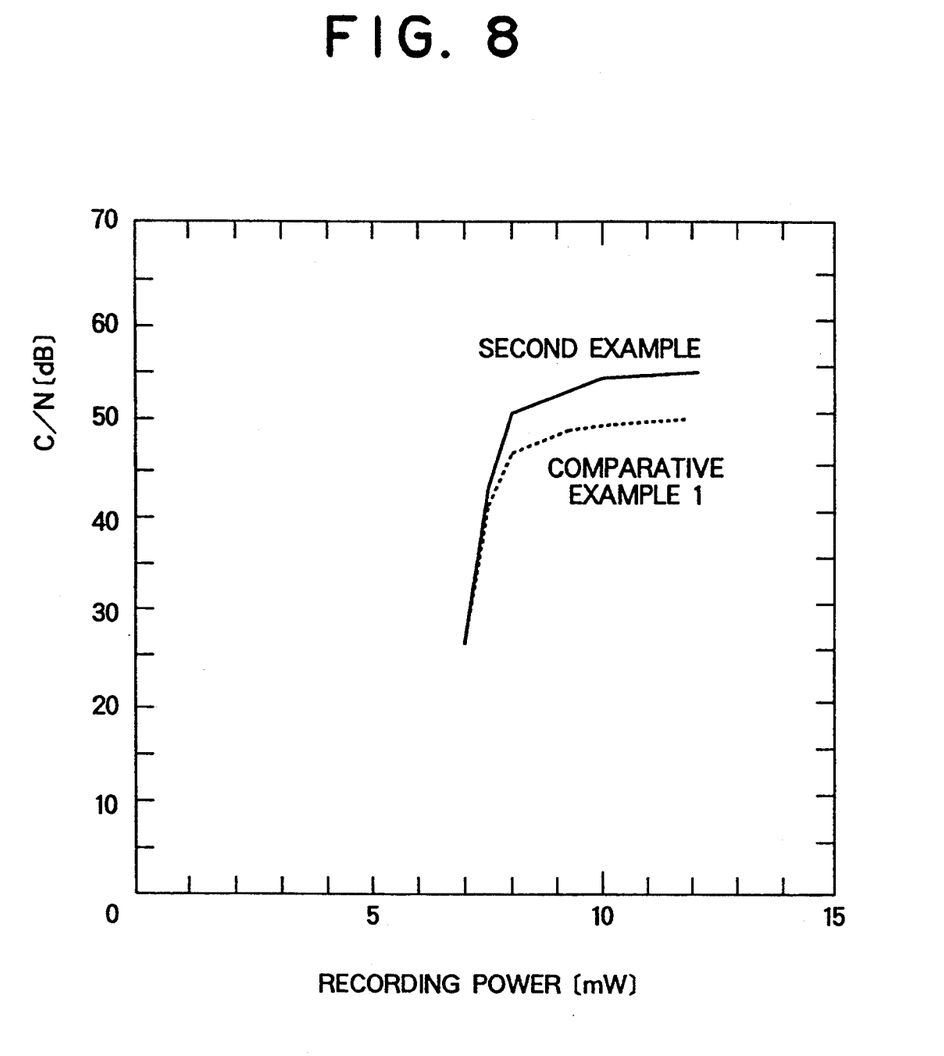
FIG. 8 is a graph showing recording characteristics of an optical data recording media according to an embodiment of the invention.

A disk as follows was composed as comparative example 1 having a like variation in reflectance but small optical phase change upon the physical phase transition. That is, a base layer of ZnS-20 atomic % of SiO$_2$ layer with 210 nm thick, a recording layer of Ge$_1$Sb$_4$Te$_7$ layer with 20 nm thick, a protection layer of ZnS-20 atomic % of SiO$_2$ layer with 20 nm thick and a reflective layer of Al layer with 60 nm thick were successively formed on the same polycarbonate substrate in this order by sputtering for each layer. An ultra-violet curing resin with 9.2 μm thick was coated on the Al layer to complete a specimen. The thus formed disk was subjected to comparative testing. The reflectance for rays incident on the substrate was 28.8% in the amorphous state and 38.1% in the crystallized state. The optical phase change upon the transition from the crystalline state to the amorphous state calculated by the matrix method was very small, specifically 3.2°. Recording characteristics were measured on both disks of the second example and comparative example 1 at a recording frequency of 3.7 MHz with the recording duty of 50%. The result is shown in FIG. 8.

The ratio of carrier wave to noise (which will be abbreviated as C/N) was 53.9 dB in the second example. In contrast, comparative example 1 exhibited a C/N of only 49.3 dB. The observation of recording marks with a transmission electron microscope showed that the width of the recording mark was about 0.7 μm, or smaller than the diameter of the spot of the laser beam for reproduction. In spite of this, the second example in which optical phase difference was large exhibited high C/N, since signals were enhanced by the interference caused by the optical phase difference. On the other hand, comparative example 1 showed a low C/N since signals were generated only by the changes of reflectance with little contribution from the optical phase difference.

As a third example a disk was prepared such that a base layer 2 of ZnS-20 atomic % of SiO$_2$ layer with 210 nm thick, a recording layer 3 of Ge1Sb$_4$Te$_7$ with 15 nm thick, a protection layer 4 of ZnS-20 atomic % of SiO$_2$ layer with 20 nm thick and a reflective layer 5 of Al with 60 nm thick were successively formed by sputtering for each layer on a polycarbonate disk substrate 1 having a diameter of 130 mm with 1.2 mm thick. The disk was further coated with an ultraviolet curing resin of 9.2 μm thick to make a specimen to be evaluated in the experiment. The reflectance for rays incident on the substrate immediately after the film forming was 2.0%, while the reflectance after crystallization was 17.2%. The optical phase change upon transition from the crystalline state to the amorphous state was calculated −60° by the matrix method.

Figure 9:
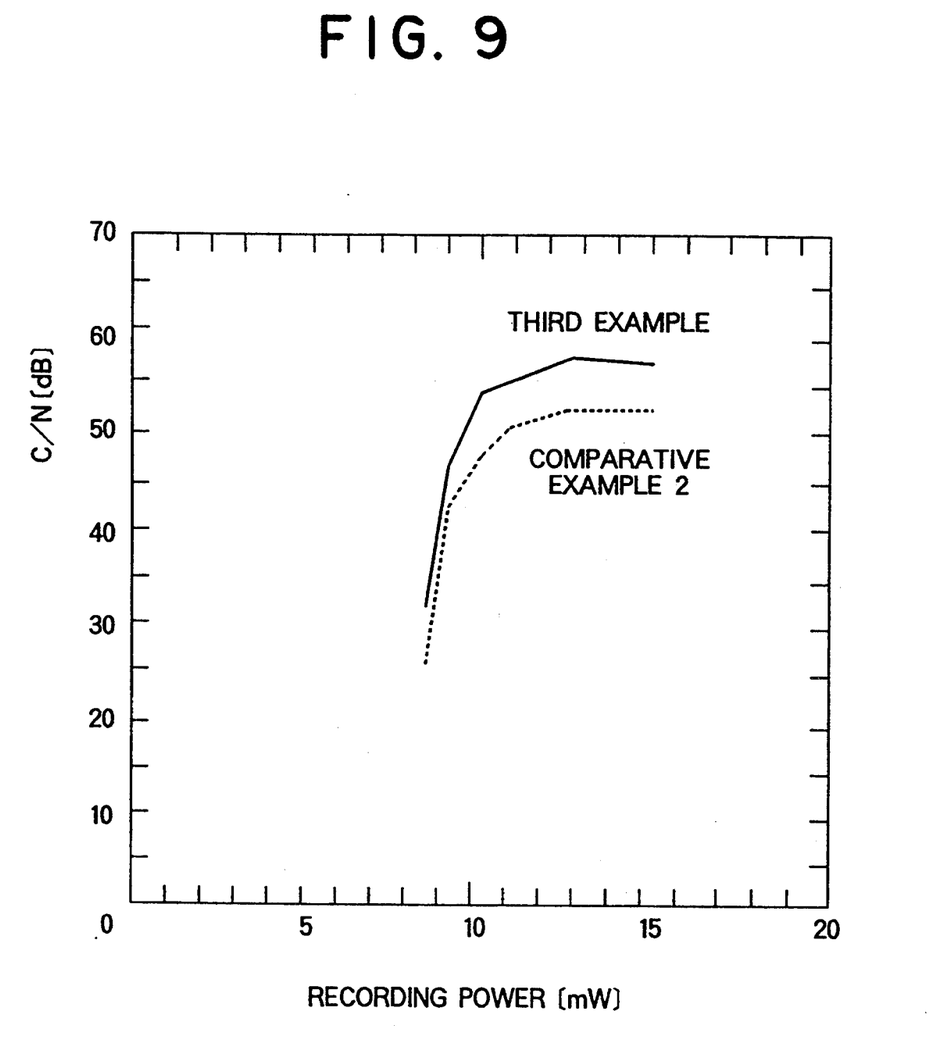
FIG. 9 is a graph showing recording characteristics of an optical data recording media according to an embodiment of the invention.

As comparative example 2, a base layer of ZnS-20 atomic % of SiO$_2$ layer with 210 nm thick, a recording layer of Ge1Sb$_4$Te$_7$ layer with 6 nm thick, a protection layer of ZnS-20 atomic % of SiO$_2$ layer with 20 nm thick, and a reflective layer of Al layer with 60 nm thick were sputtered successively in this order onto a like polycarbonate substrate. An ultra-violet curing resin of 9.2 μm thick was further coated over the Al layer to complete a specimen. The reflectance for rays incident on the substrate was 32.3% in the amorphous state immediately after the film forming and 17.9% in the crystallized state. That is, the specimen had a higher reflectance for rays incident on the substrate in the amorphous state immediately after the film forming than in the crystallized state, in opposition to the third example. The optical phase change upon the physical phase transition from the crystallized state to the amorphous state was calculated −21° by the matrix method. Both the specimens were evaluated in the similar conditions as in the second example. The recording film was irradiated with the laser beam before recording so as to be changed from the amorphous state immediately after the film forming into the crystallized state. Recording characteristics were measured on both disks of the third example and comparative example 2 at a recording frequency of 3.7 MHz with a recording duty of 50%. The result is shown in FIG. 9.

The C/N in the third example was 57.6 dB, whereas the C/N in comparative example 2 was 52.3 dB. The changes in reflectance of the third example and comparative example 2 are nearly equal, but the C/N of the former and the C/N of the later differ 5 dB or more. This can be explained as follows. In the third example, the reproduction light intensity drops as the reflectance is decreased consequent upon the recording. In addition, since the recording marks are smaller in diameter than the laser beam spot for reproduction, interference occurs due to the optical phase difference between the light rays reflected by the amorphous state and by the crystalline state, and the interference effect reduces the reproduction light intensity. Because of the combination of these drops regarding to the light intensity, the reproduction signal becomes large. On the other hand, in comparative example 2 the light intensity for reproduction increases as the reflectance is increased upon the recording, while the reproduction light intensity decreases due to the interference effect of the optical phase difference. Accordingly the two effects offset each other, so that the reproduction signal tends to become smaller.

In fourth example, three kinds of the thickness, that is, 170 nm, 200 nm and 230 nm were set as base layer 2 of ZnS-20 atomic % of SiO$_2$ layer. A base layer 2 having any one of the above thickness, a recording layer 3 of Ge$_1$Sb$_4$Te$_7$ with 20 nm thick, a base layer 2 of ZnS-20 atomic % of SiO$_2$ layer with 20 nm and a reflective layer 5 of Al with 60 nm were formed successively by sputtering for each layer on a Guide-Grooved polycarbonate substrate 1 of 130 mm in diameter with 1.2 mm thick. An ultra-violet curing resin with 9.2 μm thick was coated on the Al layer. According to the calculations by the matrix method, the optical phase change caused by recording is −26.3° for the specimen with a 170 nm-base layer, 1.3° for the specimen with a 200 nm-base layer and 46.1° for the specimen with a 230 nm-base layer.

Figure 10:
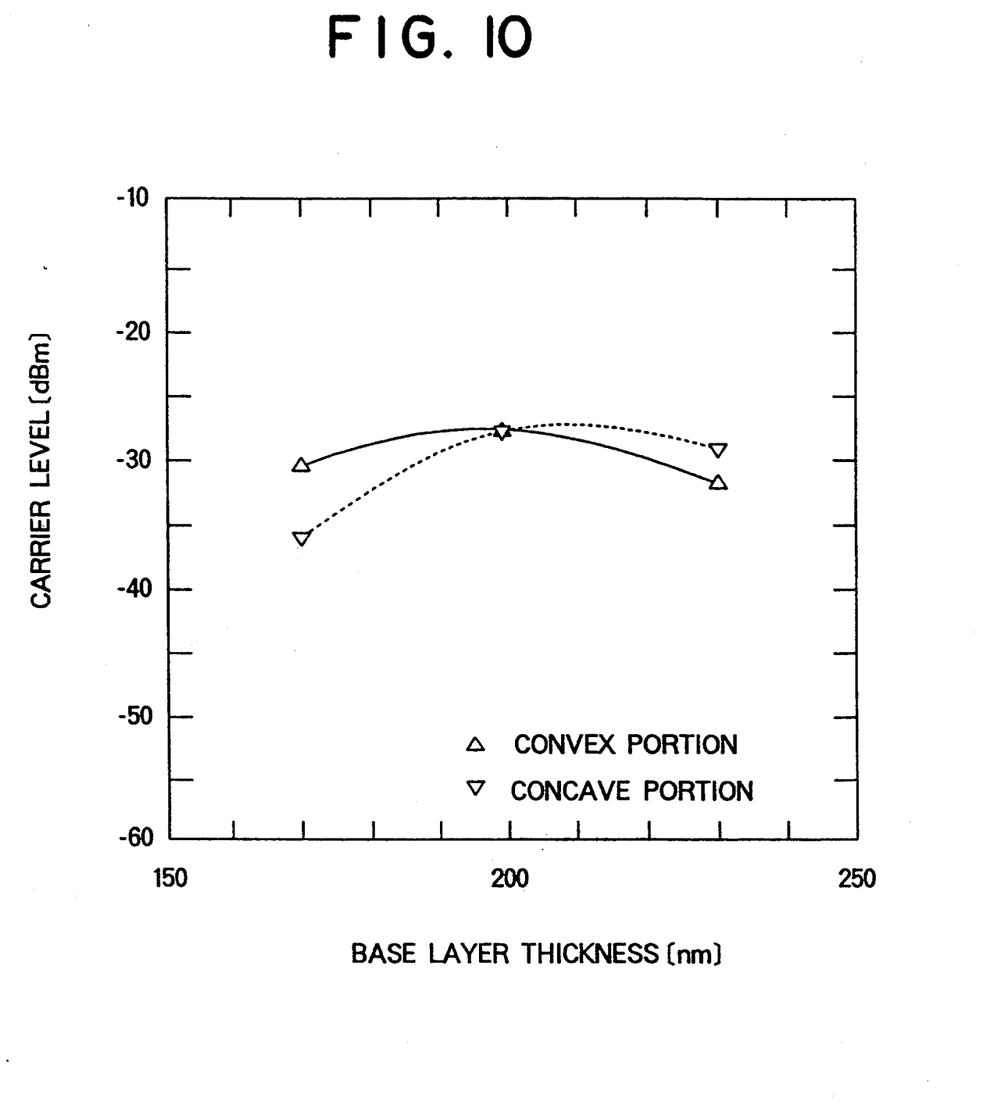
FIG. 10 is a graph showing recording characteristics of an optical data recording media according to an embodiment of the invention.

The substrate used was provided with Grooves having convex portions of 0.65 μm in width, concave portions of 0.60 μm in width, a groove depth of 0.08 μm and a groove pitch of 1.6 μm. The recording film was irradiated before recording by the laser beam to change the amorphous state immediately after the film forming into the crystalline state. The reflectances before and after the crystallization were 6.2% and 16.8% for the specimen with a 170 nm-base layer, 7.1% and 26.9% for the specimen with a 200 nm-base layer and 6.0% and 19.5% for the specimen with a 230 nm-base layer, respectively. From this result, it is found that the specimen having a base layer thickness of 200 nm has a largest change in the reflectance. In the measurement the linear velocity was 11.3 m/s, the recording frequency was 3.7 MHz and the recording duty was 50%. Recording characteristics were measured for both the concave portion and the convex portion of the substrate so as to investigate dependence of the recording characteristics upon the thickness of the base layer, or dependence of the recording characteristics upon the optical phase change associated with the physical phase change. The result is shown in FIG. 10. The specimen of the base layer with 230 nm thick having the positive optical phase change upon the recording, exhibits a higher carrier level when the recording is effected in the concave portion. In contrast, the specimen of the base layer with 170 nm thick having the negative optical phase change upon the recording shows a higher carrier level when the recording is executed in the convex portion. The specimen of the base layer with 200 nm thick having little optical phase change upon the recording has little difference in carrier level between the concave portion and the convex portion. Thus, it is possible to obtain increased reproduction of carriers by executing recording in the concave portion when the optical phase change associated with recording is positive, and in the convex portion when the phase change is negative.

Figure 11:
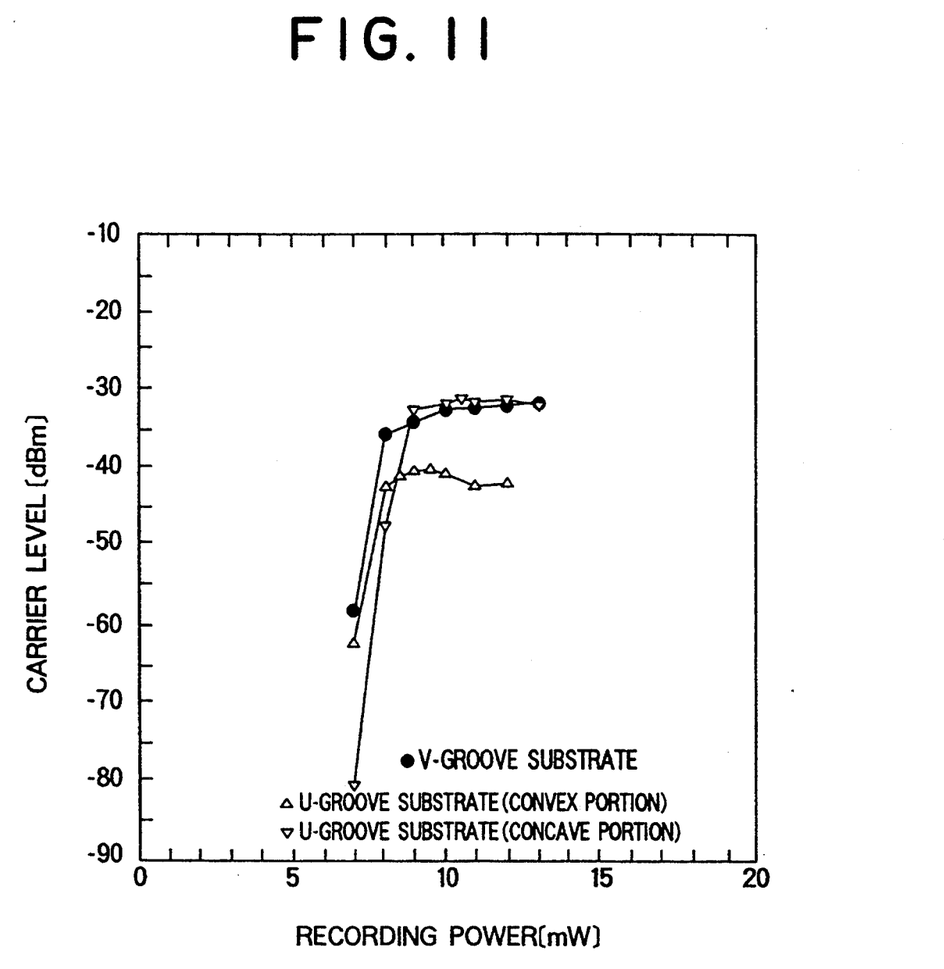
FIG. 11 is a graph showing recording characteristics of an optical data recording media according to an embodiment of the invention.

As an example shown in FIG. 5, prepared was a specimen having a larger optical phase change upon the physical phase transition than that of the example shown in FIG. 4. A base layer of ZnS-20 atomic % of SiO$_2$ layer with 250 nm thick, a recording layer 3 of GeISb$_4$Te$_7$ with 20 nm thick, a protection layer of ZnS-20 atomic % of SiO$_2$ layer with 20 nm thick, and a reflective layer 5 of Al with 60 nm were formed successively by sputtering for each layer on a guide-grooved polycarbonate substrate 1 of 130 mm in diameter and 1.2 mm in thickness. An ultra-violet curing resin with 9.2 μm thick was coated on the Al layer. For evaluation, two kinds of substrate were employed, one of which was provided with U-shaped grooves having convex portions 9 of 0.65 μm in width, concave portions 8 of 0.60 μm in width, a groove depth of 0.08 82 m and a groove pitch of 1.6 μm (refer to FIGS. 5 and 6), the other of which was provided with V-grooves 6 having convex portions of 1.1 μm in width, a groove pitch of 1.6 ρm (refer to FIG. 1). The recording film was irradiated before recording by the laser beam so as to be changed from the amorphous state immediately after the film forming into the crystalline state. The reflectance for rays incident on the substrate was 9.6% in the amorphous state and 18.0% in the crystallized state. The optical phase change upon the change to the amorphousness calculated by the matrix method was 108.5°. The recording was conducted at a frequency of 3.7 MHz with recording duty of 50%. FIG. 11 shows recording characteristics for the V-groove substrate (FIG. 1), and for the concave portions and the convex portions on the U-groove substrate (FIGS. 5 and 6). With regard to carrier level, the case where recording was effected in the concave portions 8 on the U-groove substrate exhibited the highest level, and the case in which recording was effected on the V-groove substrate showed slightly lower level than the highest level. On the other hand, when the recording was effected in the convex portions 9 of the U-groove substrate, the level was lower by about 10 dB than the above two. Since the width for recording on the U-groove substrate is smaller than that on the V-groove substrate, recording marks formed are considered to be narrower than those on the V-groove substrate. For this reason, the carrier level normally becomes low. Nevertheless, by setting the optical phase difference associated with the physical phase transition to be large, the carrier level can be heightened.

What is claimed is:

1. A method for recording, erasing and reproducing data on an optical data recording media which can be set to states of high and low optical reflectance or transmittance, said recording media comprising a substrate having guide grooves formed therein, said guide grooves being defined by concave and convex portions of said substrate, a width of one of said concave and convex portions being smaller than the diameter of a laser beam spot used for recording and erasing, said method comprising the steps of:

temporarily setting a recording layer of said media to a state of high reflectance when the variations of the reflectance is to be detected, and to a state of high transmittance when the variations of the transmittance is to be detected;

detecting variations of the reflected light intensity as signals; and effecting at least one of recording and erasing operations using the concave portions when an optical phase change upon a physical phase transition from a state of higher reflectance to a state of lower reflectance is positive, and using the concave portion when the optical phase change upon the physical phase transition from a state of a higher reflectance to a state of a lower reflectance is negative.

* * * * *

UNITED STATES PATENT AND TRADEMARK OFFICE
CERTIFICATE OF CORRECTION

PATENT NO. : 5,342,714
DATED : August 30, 1994
INVENTOR(S) : Tatsunori IDE

It is certified that error appears in the above-indentified patent and that said Letters Patent is hereby corrected as shown below:

Col. 7, line 55, delete "Ge1" and insert --$Ge_1$--.

Col. 8, line 3, delete "Ge1" and insert --$Ge_1$--.

Col. 9, line 43, delete "Ge1" and insert --$Ge_1$--;

line 53, delete "82 m" and insert --$\mu$m--.

Signed and Sealed this

Eleventh Day of April, 1995

*Attest:*

BRUCE LEHMAN

*Attesting Officer*     *Commissioner of Patents and Trademarks*